United States Patent [19]

Da Silva et al.

[11] Patent Number: 4,612,544
[45] Date of Patent: Sep. 16, 1986

[54] MEMORY ARRANGEMENT WITH ORDERED WRITING PARTICULARLY INTENDED FOR COOPERATION WITH A RADAR IMAGE DISPLAY UNIT

[75] Inventors: Jean P. X. Da Silva, Sartrouville; Jean-Yves M. Guiglini, Argenteuil, both of France

[73] Assignee: U.S. Philips Corporation, New York, N.Y.

[21] Appl. No.: 511,376

[22] Filed: Jul. 6, 1983

[30] Foreign Application Priority Data

Jul. 7, 1982 [FR] France ................................ 82 11926

[51] Int. Cl.⁴ .......................... G01S 7/04; G06F 12/00
[52] U.S. Cl. ............................... 343/5 DP; 343/5 EM; 364/900
[58] Field of Search ............. 343/5 DP, 5 EM, 5 VQ; 340/799; 364/200, 900

[56] References Cited

U.S. PATENT DOCUMENTS

| | | | |
|---|---|---|---|
| 3,325,806 | 6/1967 | Wilmot et al. | 343/5 DP X |
| 3,381,277 | 4/1968 | Stansby | 364/900 |
| 3,810,174 | 5/1974 | Heard et al. | 343/5 DP |
| 3,827,027 | 7/1974 | Towson et al. | 343/5 DP X |
| 3,838,420 | 9/1974 | Heard et al. | 343/5 SC |
| 3,882,502 | 5/1975 | Peabody et al. | 343/17 |
| 3,975,730 | 8/1976 | Maeda et al. | 343/5 DP X |
| 4,017,853 | 4/1977 | Brandao et al. | 343/5 DP |

Primary Examiner—T. H. Tubbesing
Assistant Examiner—Gilberto Barrón, Jr.
Attorney, Agent, or Firm—Robert J. Kraus

[57] ABSTRACT

An arrangement for use with a radar image display unit which includes a main memory (1) for storing data words at respective addresses, and an input circuit (20) having an output connected to the data input (15) of the main memory and at least one input (22) for receiving input words to be written into the main memory at respective addresses. The arrangement includes a memory (40) having corresponding addresses and a write circuit (45) for writing in these corresponding addresses a predetermined first word when a data word is written into the main memory, and for writing in all other addresses a predetermined second word, under the control of an updating signal. The input circuit includes a control element (50) operative during reading the output of the main memory. Whenever a data word is read from a memory address for which the second word is stored in the corresponding address of the memory (40), an invalidation word is entered into the main memory at this address.

5 Claims, 7 Drawing Figures

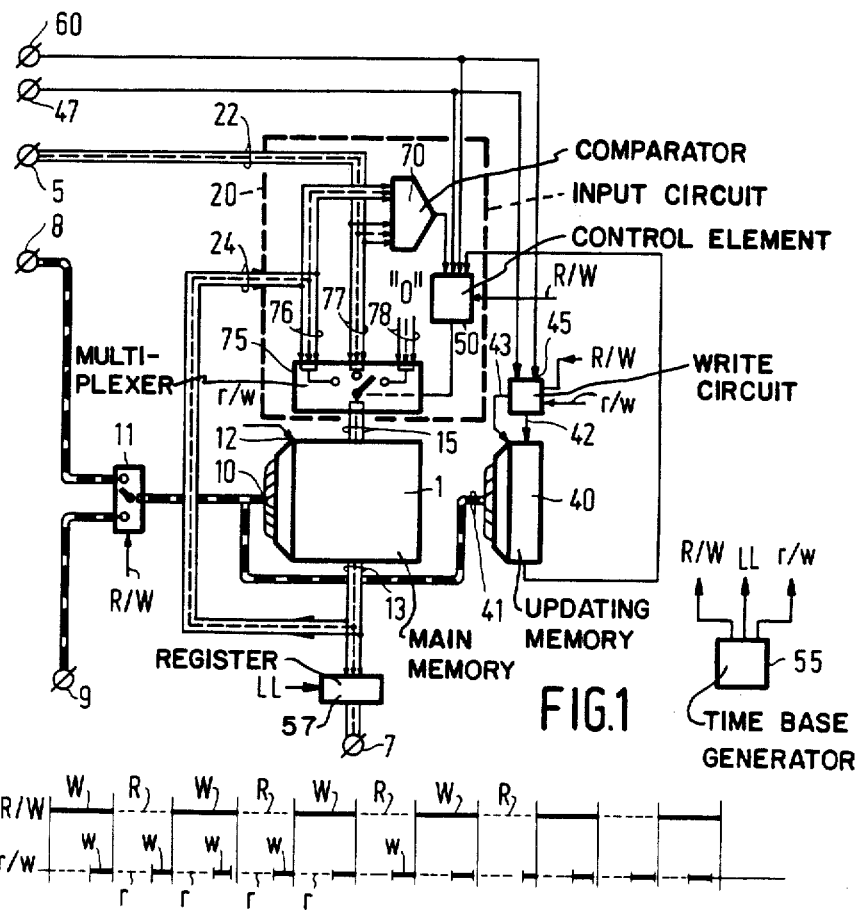
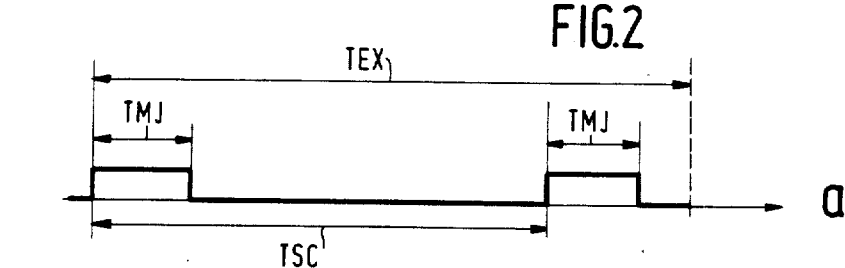
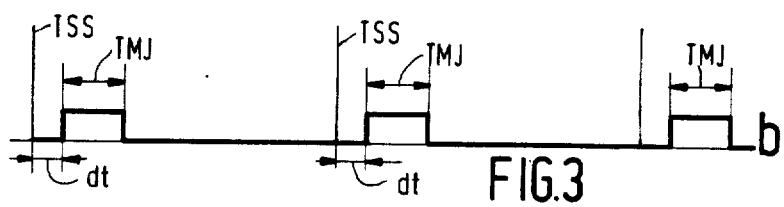

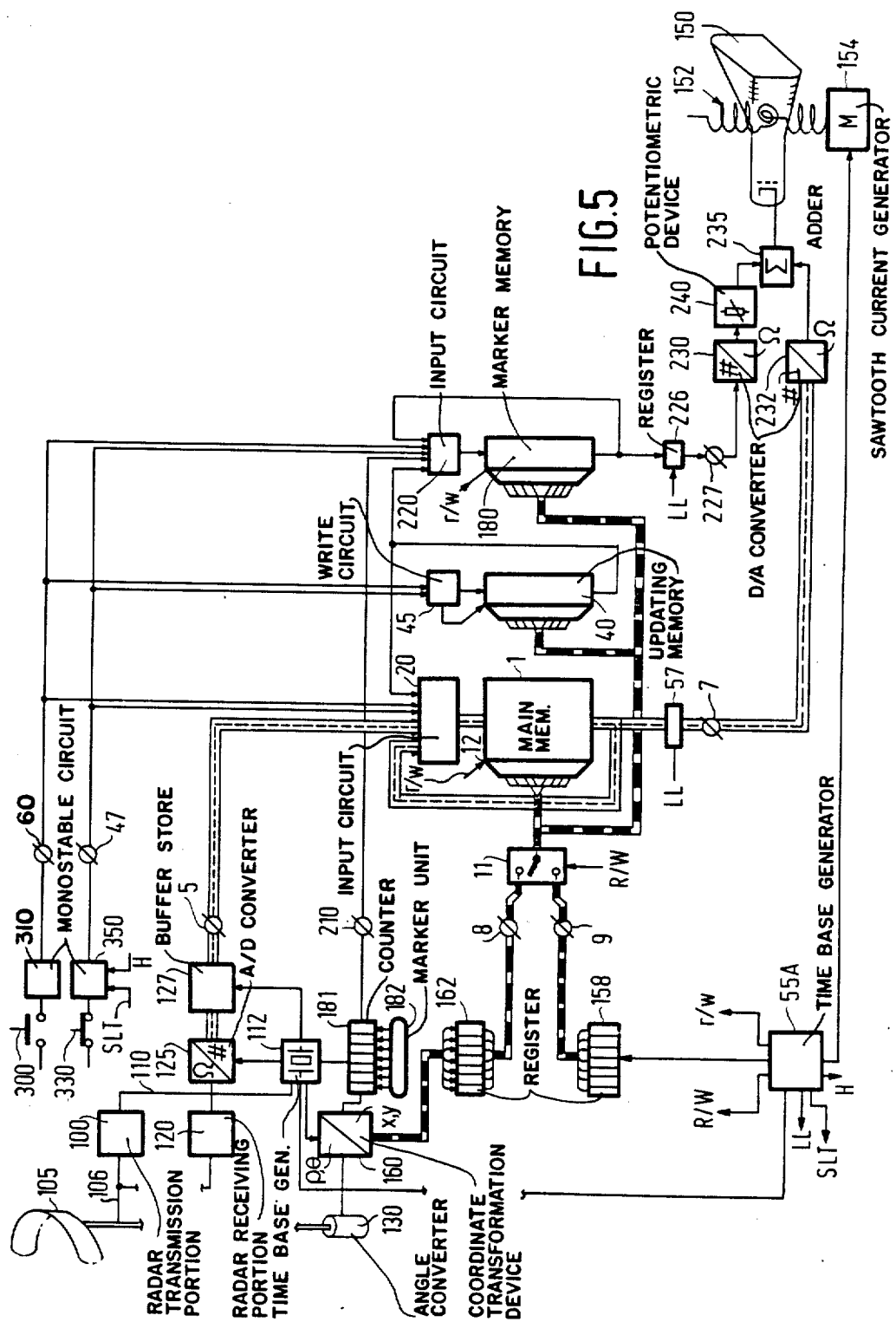

MEMORY ARRANGEMENT WITH ORDERED WRITING PARTICULARLY INTENDED FOR COOPERATION WITH A RADAR IMAGE DISPLAY UNIT

BACKGROUND OF THE INVENTION

The invention relates to a memory arrangement with ordered writing, particularly intended for use with a radar image display unit. The arrangement comprises a memory, commonly referred to as a "main memory", for storing data words at respective addresses, an input circuit having an output connected to the data input of the main memory, and at least one input for receiving input words to be stored in the main memory at respective addresses.

Arrangements of this kind used in association with radar image display units make it possible to produce an image whose luminance does not depend on the radar scan. Data words which represent the amplitudes of radar echoes are written into the main memory at addresses which correspond to the positions of the echoes on the radar image. Writing is effected at a slow rate determined by the radar scan. To obtain a good image a cathode-ray tube of the type used in television is employed. The video information represents the data words written into the main memory at a fast rate, which is displayed by the scanning operation of the cathode-ray tube.

Often the center of the radar scan is shifted, and the data stored in the memory before the shift must be updated to present an accurate display to the observer.

An arrangement of the type described in the opening paragraph by means of which it is possible to effect this updating is known from French Pat. No. 2,459,486 which corresponds to United Kingdom Pat. No. 2,052,910. This prior art arrangement comprises an input circuit including a limiter connected to the output of the memory which functions to reduce the value of the word which represents the amplitude of the echo already stored, and a comparator provided to compare the values of the words at the output of the limiter and the word which is to be recorded; the word which is ultimately recorded is the word which has the highest value. Thus, the value of the words representing the echoes already stored decreases with time, which shows on the display screen by a gradual dimming.

This arrangement has the drawback that to provide this gradual dimming it is necessary for the words to be composed of a large number of binary elements. Thus the main memory must have a large capacity.

SUMMARY OF THE INVENTION

It is an object of the invention to provide an arrangement of the type described in the opening paragraph which makes it possible to employ a memory having a small capacity.

According to the invention, an updating memory is provided which has addressable memory locations corresponding to those in the main memory. A writing circuit is provided for writing a predetermined first word in the locations corresponding to the same address where a data word is written into the main memory, and for writing in all other addresses a predetermined second word, under the control of an updating signal. The input circuit comprises a control element, operative during reading the output of the main memory. Whenever a data word is read from a main memory address for which the second word is stored in the corresponding address of the updating memory, an invalidation data word is written into the main memory at this address.

The predetermined first and second words may be provided by one single binary element, so that the memory utilized has a very small capacity.

BRIEF DESCRIPTION OF THE DRAWING

The following description, given by way of nonlimitative example with reference to the accompanying drawing figures, will make it better understood how the invention can be put into effect.

FIG. 1 shows a memory arrangement according to the invention.

FIG. 2 shows, as a function of time, the write and read instants of the memory.

FIGS. 3a and 3b show the updating period relative to a radar scanning period.

FIG. 5 shows a radar device comprising an arrangement according to the invention.

DESCRIPTION OF THE PREFERRED EMBODIMENT

Figure 4:
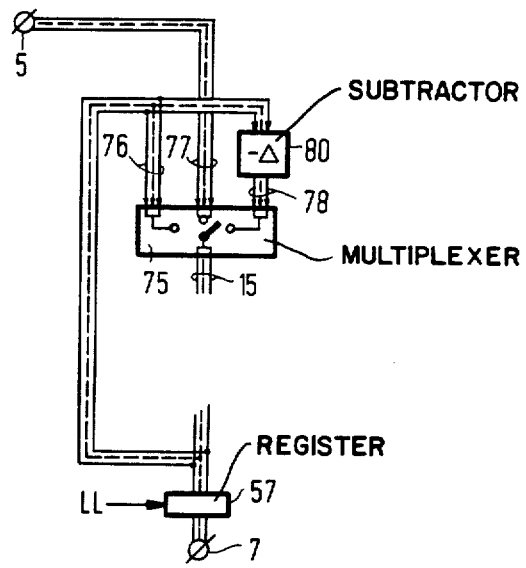
FIG. 4 shows a variation of the embodiment of the input circuit.

FIG. 1 shows an arrangement according to the invention including a main memory 1. The input data to be recorded in the memory 1 appears at a terminal 5 in parallel form, while the output data becomes available to the user at a terminal 7. Addresses at which the respective input data are to be recorded are applied to a terminal 8. In order to obtain output data from any address, the address must be applied to a terminal 9. The memory 1 has an input 10 for receiving the address codes. The input 10 is connected to the terminals 8 and 9 via a selector switch 11. The memory 1 is adjusted to the read or write mode by means of a read-write control 12. During reading, the data is made available at memory output 13 and during writing the data must be present at memory input 15. An input circuit 20 selects the data to be recorded in the memory 1. A first input 22 of this circuit is connected to the terminal 5; a second input 24 is connected to the output 13 of the memory 1. The output of this circuit is connected to the input 15 of the memory 1. The memory 1 has an extensive set of addresses (for example from 0 to 32767).

According to the invention, corresponding memory locations are provided in an updating memory 40 which has an addressing input 41 connected to the addressing input 10 of the memory 1. The updating memory 40 has a data input 42 and a write-read control 43. A write circuit 45 is also provided to enter a first word (for example a binary "1") in the same addresses where data words are written in the main memory 1, and for writing in all other addresses a second word (in this same example a binary "0"), under the control of an updating signal appearing at the terminal 47.

The input circuit 20 comprises a control element 50, operative during reading the output of the main memory. Whenever a data word is read from a main memory address for which the second word (a "0") is stored in the corresponding address of the updating memory 40, an invalidation word ("0 . . . 0") will be stored in the main memory at that address.

Before describing how the arrangement according to the invention operates it should be noted that, in the example described, the memories 1 and 40 are dynamic memories (MK 4027) produced by MOSTEK. The read periods R (see FIG. 2) correspond to the times at which the address codes at terminal 9 are applied to the inputs 10 and 41 of the memories 1 and 40. In each interval R the address codes for all the memory locations in 1 and 40 are successively applied to the terminal 9. Although they are designated as read periods, it is possible, as will be apparent hereinafter, to effect writing into the memories 1 and 40. The periods W, which are of the same duration as the periods R, are inserted between these periods R and correspond to times when the address codes at the terminal 8 are applied to the addressing inputs 10 and 41 of the memories 1 and 40. Before recording the data provided at the terminal 5, the data already contained in the memory 1 must be read. Thus, each of the periods W and R is divided into a read period "r" and a write period "w". These periods of time are determined by a time base generator 55, which supplies the different signals on the wires R/W to define the periods R and W and r/w for the periods of time r and w. The switching control for the change-over switch 11 is connected to the wire W/R and the read-write control 12 of the memory 1 is connected to the wire r/w. Two inputs of the circuit 45 are also connected to the wires R/W and r/w. When the field of application is the contemplated radar device, the data arrive intermittently at the terminal 5, so that not every instant W will be used for writing new data, whereas almost all the instants R will be used to furnish the user with different recorded information. The data is passed through a register 57, which is connected between the output 13 of the memory 1 and the output terminal 7. Register 57 is controlled by the signals from wire LL to effect transfer of the data to the output terminal during the periods R. It should be noted that writing a different word into the memory during the portion w of R has no immediate effect on the output signal.

The updating operation, which consists of writing "0" into the memory 40 at all of its addresses, is effected during the read period R and requires a time TMJ (see FIG. 3a) which is much shorter than the time TEX during which a radar scan is effected. FIG. 3a relates to a radar scan having a circular sweep. The period TSC, in which the updating signal appears, is somewhat shorter than TEX. FIG. 3b relates to a scan having a sectiorial sweep, the instants TSS corresponding to changes in the direction of scan, and the instants at which the updating periods appear each occurring after a short delay DT following the instants TSS. The time delays dt correspond to the times required to detect the changes in the direction of scan.

Updating is effected in the following way. At the commencement of one of the periods R, the information contained in the memory 1 is read at its output 13, and also the word in the form of a binary element is read from the output of memory 40. When this binary element is "0", this means that during the last update no new information was written into the memory 1, because each time information is written in the memory 1 a binary element "1" is written into memory 40. When a data word accompanied by a binary element "0" is read, the output of the memory 40 causes, during this same period R, a word "0 . . . 0" to be entered into memory 1, which is equivalent to erasing the information.

An erase control 60, which is connected to the input circuit 20 and also to the write circuit 45, makes it always possible to enter, during the periods R, words "0 . . . 0" into the memory 1 and "0's" into the memory 40.

THe input circuit 20, as illustrated in FIG. 1, comprises a comparator 70 to compare during the period W the information at the output of the memory 1 with the information at terminal 5 to be recorded. When the information at the output 13 is accompanied by a binary element "1" at the output of the memory 40, the information recorded is the information having the largest amplitude; when it is accompanied by the element "0", the information at the terminal 5 is recorded.

The control element 50 effects different switching actions within a multiplexer 75 as a function of the following information: read or write time (R/W), updating control (terminal 47), erase control (terminal 60), output of the comparator 70 and output information of the memory 40. The output of the multiplexer 75 is connected to the input 15 of the memory 1. The multiplexer 75 has inputs 76, 77, 78. The input 76 corresponds to the input 24 of the circuit 20, the input 77 to input 22, while input 78 permanently receives a signal representing the invalidation word "0 . . . 0". The following Table 1 is a survey of the operation of the circuit 50, which may be in the form of a ROM (or preferably in the form of a programmed logic network) for which the information determines the address (the inputs, respectively), the output signals of this ROM (of this network) being applied to the control input of the multiplexer 75. The erase and update signals are assumed to be active signals, when they have the logic value "1". The values "x" indicates without discrimination either the values 1 or 0.

TABLE I

| Update (47) | Erase (60) | Output comparator | Output signal of memory 40 | R/W | Change-over effected |
|---|---|---|---|---|---|
| 0 | 0 | x | x | R | 76-15 |
|   |   | [7] > [5]* | x | W | 76-15 |
|   |   | [5] > [7] | x | W | 77-15 |
| x | 1 | x | x | R or W | 78-15 |
| 1 | 0 | x | 0 | R | 78-15 |
|   |   | x | 1 | R | 76-15 |
|   |   | [7] > [5]* | x | W | 76-15 |
|   |   | [5] > [7]* | x | W | 77-15 |

*The [ ] indicate that the value of the signal available at the input 5 or at the output 7 are considered, these figures being placed between brackets.

The circuit 45 must perform the functions, which are summarized in the following Table II. To simplify reading of this Table the logic values "1" and "0" are associated with the times r and w, respectively. These values have the same meaning for the input 43.

TABLE II

| Update (47) | Erase (60) | R/W | r/w | Signal at input 43 | Signal at input 42 |
|---|---|---|---|---|---|
| 0 | 0 | R | 1 | 1 | x |
|   |   |   | 0 | 1 | x |
|   |   | W | 1 | 1 | x |
|   |   |   | 0 | 0 | 1 |
| 1 | 0 | R | 1 | 1 | x |
|   |   |   | 0 | 0 | 0 |
|   |   | W | 1 | 1 | 1 |
|   |   |   | 0 | 0 | 1 |
| x | 1 | R | 1 | 1 | x |
|   |   |   | 0 | 0 | 0 |
|   |   | W | 1 | 1 | x |
|   |   |   | 0 | 0 | 0 |

If so desired, the invention makes it possible to eliminate echoes progressively. For that purpose a subtractor 80 can be arranged between the output 13 and the input 78. This is shown in FIG. 4.

FIG. 5 shows a radar system comprising an arrangement according to the invention. Elements corresponding to those in the preceding Figures have been given the same reference numerals.

This radar operates with high-frequency pulses which ar processed by means of a transmission portion 100 provided by, for example, a magnetron. The high-frequency pulses are transmitted to a mobile antenna 105 via a duplexer 106. The portion 100 supplies via a wire 110 a signal which indicates the time at which the pulse transmission is effected. This signal is used to synchronize a time base generator 112. The pulse reflected from an obstacle is captured by the antenna 105 and transmitted to the receiving portion 120 via the same duplexer 106. The signal representing the amplitude of the wave reflected from the obstacle is converted into a digital signal by means of an analog-to-digital converter 125. The code which represents this digital signal is thereafter entered into a buffer store 127, which makes it available at the terminal 5. The conversion rate of the converter 125 and the storage rate of the memory 127 are fixed by the time base generator 112. The mobile antenna 105 is subjected to a rotational motion, the angle of which is measured by an angle converter 130. The angle information combined with the time information supplied by the time base generator 112 then gives the position, in polar coordinates ($p$, $\theta$), of the source of the echo. The radar shown in FIG. 5 is designed for display by a cathode-ray tube of the type used in television. Connected to this tube is a magnetic line and field deflection block 152, which is operated by a sawtooth current generator 154. The time base generator 55a supplies read address codes for the memory via a register 158 whose outputs are connected to the terminal 9. In addition, it produces clock signals on the wire H and line and field-blacking signals on the wire SLT. The time base generator 55a is coupled to the time base generator 112 to ensure that the data is applied at the proper instants to the main memory 1. It also synchronizes the sawtooth current generator 154. Because the display is effected in accordance with a so-called "x, y" coordinate system, it is necessary to employ a coordinate transformation device 160 to transform the information from the device 130 and the time information supplied by the time base generator 112. The write address code thus obtained is stored in a register 162.

In accordance with an important feature of the invention, the updating memory 40 may be coupled to a second so-called marker memory 180. This memory stores distance marker data, which are displayed on the tube 150 as bright dots designating predetermined distances. To determine these distances, a counter 181 is used which is loaded with a number processed by a marker unit 182. This number represents the distance between the markers one wants to display. Loading this number is effected at the instant corresponding to $p=0$ determined by unit 160 and also each time the counter reaches its lowest count. The time base generator 112 supplies down-counting signals to this counter. When the counter reaches its lowest count a signal appears at a terminal 210 representing the bright dots to be displayed. The terminal 210 is connected to an input circuit 220 whose structure is identical to the structure of the circuit 20 and whose mode of operation is the same as that summarized in the above Table I. The signal at the output of the marker memory 180 is made available at a terminal 227 by means of a register 226 which is controlled in the same way as the register 57. This signal is applied to a digital-to-analog converter 230 while the output signal of the memory 1, available at the terminal 7, is applied to a digital-to-analog converter 232. Before being combined with the output signal of the converter 232, by means of an adder 235, the output signal of the converter 232 is applied to a potentiometric device 240 to cause the brightness of the markers on the tube screen 150 to vary, the output of the adder 235 being connected to the cathode of tube 150.

To erase the memories 1, 40, 180 an erase control 300 has been provided which acts, for example, on a monostable circuit 310 which is connected to the terminal 60 and whose period is such that it corresponds to the period of one read cycle of these memories. Similarly, for updating, a further control 330 is provided which acts upon a circuit 350 connected to the terminal 47. It will be obvious that this circuit may be triggered by the angle encoder 130 at slightly less than each turn of the antenna 105 or at any rate when this antenna changes its direction of rotation in the case of a sectorial scan.

Figure 6:
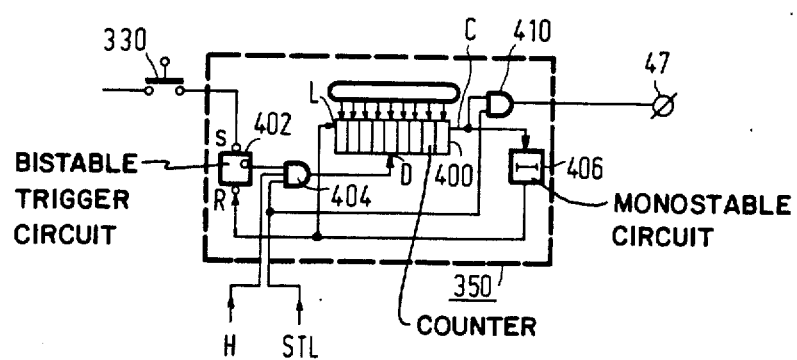
FIG. 6 shows a detail of an embodiment of a circuit which forms part of the radar device of FIG. 5.

FIG. 6 shows in detail the updating signal processing circuit 350. It consists of a counter 400 whose capacity is such that it corresponds to the updating period, the frequency of the signals available on the wire H being taken account of. A bistable trigger circuit RS denoted by reference 402 renders it possible to open an AND-gate 404 when the control 330 is activated. This control is connected to the input S of the bistable trigger circuit. As the gate 404 is conductive, the pulses on the wire H are applied to the counting input D of the counter 400, outside the field and line flyback periods of the tube 150. These periods are determined by the signals STL produced by the time base 55a. When the counter 400 has ended its counting cycle, the signal at the output C changes its value to, for example, the value "0". This triggers a monostable circuit 406 which then produces a pulse which is applied to the input R of the bistable trigger circuit to adjust it to the rest state, and also to the load input L of the counter 400 to reset this counter to its initial state. An AND-gate 410 supplies the updating signal to the terminal 47. One of its inputs is connected to the output C of the counter 400 and a further input to the wire STL, so that the updating signal is not supplied during the field and line flyback periods.

What is claimed is:
1. A memory arrangement for storing radar data for use by a display unit, said arrangement comprising:
(a) a main memory having a multiplicity of addressable memory locations for storing respective data words;
(b) an input circuit having an output electrically connected to a data input of the main memory, an input for receiving data words to be stored in said main memory at respective ones of the memory locations, and a control element for controlling the writing of data words into the main memory;
(c) memory means having a multiplicity of addressable memory locations corresponding to those in the main memory; and
(d) a write circuit having an output electrically connected to a data input of the memory means and an input for receiving an updating signal indicating whether the main memory is being updated with new data words, said write circuit effecting the writing in said memory means of:

1. a predetermined first word in each memory location for which a new data word is written into the corresponding memory location in the main memory; and
2. a predetermined second word in all other memory locations;

said control element having an input electrically connected to an output of the memory means for periodically receiving the predetermined first and second words stored in said memory means, said control element periodically effecting writing an invalidation data word in all memory locations of the main memory corresponding to memory locations in said memory means from which one of the predetermined second words is received.

2. A memory arrangement as in claim 1 where the memory means comprises an updating memory.

3. A memory arrangement as in claim 1 or 2 where the predetermined first and second words are binary elements having the logical values "1" and "0".

4. A memory arrangement as in claim 1 or 2 for receiving data words supplied at the rate of a radar scan, where means is provided for generating the updating signal during each radar scan.

5. A memory arrangement as in claim 4 where the radar data words are received from a radar having a continuously rotating antenna, and where the updating signal has a period which is shorter than the antenna rotation period.

* * * * *